March 20, 1973 E. A. SORG ET AL 3,721,872
PROCESS AND APPARATUS FOR PRODUCING ELECTRIC FIELDS
IN CLOSED ROOMS AND FOR INTENSIFYING FIELD
EFFECTS WITHIN CONFINED SPACES
Filed July 24, 1969

INVENTORS
EWALD ADOLF SORG
UDO GERHARD SOMMER

BY *Otto John Munz*
ATTORNEY

United States Patent Office 3,721,872
Patented Mar. 20, 1973

3,721,872
PROCESS AND APPARATUS FOR PRODUCING
ELECTRIC FIELDS IN CLOSED ROOMS AND
FOR INTENSIFYING FIELD EFFECTS WITHIN
CONFINED SPACES
Ewald Adolf Sorg, Roggenstrasse 33, and Udo Gerhard
Sommer, Schlosserstrasse 36, both of Stuttgart, Germany
Filed July 24, 1969, Ser. No. 844,411
Int. Cl. H02g 3/26
U.S. Cl. 317—262 AE        5 Claims

ABSTRACT OF THE DISCLOSURE

A process for producing, intensifying and varying electric fields within a confined space, comprising the steps of surrounding said space with conductive materials, such as metal, steel-reinforced concrete and other building materials incorporating electrically-conductive substances and being exposed to the effects of the weather, connecting conductive flexible elongated foil electrodes being insulated on both sides thereof with said conductive materials by application and gluing to or placing under walls, floors, ceilings and the like, and connecting said foils to at least one electric source to produce an electric field within said space, and an apparatus for producing, intensifying and varying electric fields within a confined space, comprising means to impart conductivity to the walls of said space; means to connect flexible elongated conductive electrode foils being insulated on both sides thereof with said means to impart conductivity; a voltage source to deliver power to said electrodes; means to connect the power delivery to said source; wherein said electrode being placed under the floor covering is so provided that the insulating covering layer of said electrode serves simultaneously as protective layer against mechanical damages, and that said floor covering adheres thereto in a manner such as to prevent slipping.

BACKGROUND OF THE INVENTION

Description of the prior art

Known in the art is a device for creating bioclimatic conditions within confined spaces by means of electric fields wherein two wire screens, for example, serve as electrodes between which the field is produced. In dependence upon the voltage being applied, however, a considerable current flow will result to which bodies and substances being present within the field are exposed and under the influence of which cataphoresis and electrolysis phenomena will arise. A modified embodiment of this device has also been previously described in the art according to which, for the purpose of obtaining the electric air-conditioning of confined spaces, a ceiling electrode is employed which consists essentially of flat lamellae being disposed either in parallel or in a V-shaped manner and acting as open electrodes, and from or by which charged particles that are suspended in the air are attracted and discharged.

Field of the invention

A process and an apparatus for producing electric fields and for intensifying field effects within a defined space, employing electrodes made from flat elongated conductive and flexible materials with electronic circuitry controls connected to detectors to provide an electrically-charged atmosphere.

SUMMARY OF THE INVENTION

The invention relates to a process and an apparatus to produce electric fields of field strengths that are comparable to those of the natural electric field of the earth in a room, which fields are surrounded by conductive materials such as metal, steel-reinforced concrete, and other building materials which incorporate electrically-conductive substances. A plurality of flat, sheet-like, flexible electrodes are mounted in the room. Each of the electrodes consists of five successive layers of three different materials. The first and outer layer consists of a protective material that is resistant to mechanical damages. The second layer consists of a substantially thin electrically insulating material. The third layer consists of electrically conductng material. The fourth layer consists of substantially thin electrically insulating material. The fifth and outer layer consists of a protective material that is resistant to mechanical damages. All five of the layers are physically connected together. At least one voltage source is provided to deliver power to the electrodes and is connected to the third layer of each of the electrodes. The output voltage of the voltage source alternates between a constant high voltage and earth potential in moderately rapid succession. The pulse rate of the voltage source is manually adjusted. The high voltage is of such an absolute value so as to produce in the room an average electric field strength of the earth's electric field in open country near the ground.

BRIEF DESCRIPTION OF THE DRAWINGS

FIG. 5 is a cross-sectional schematic view illustrating a sheet of electrodes.

DESCRIPTION OF THE PREFERRED EMBODIMENTS

Several technical details of the present invention are represented in the accompanying drawing.

Figures 1A, 1B:
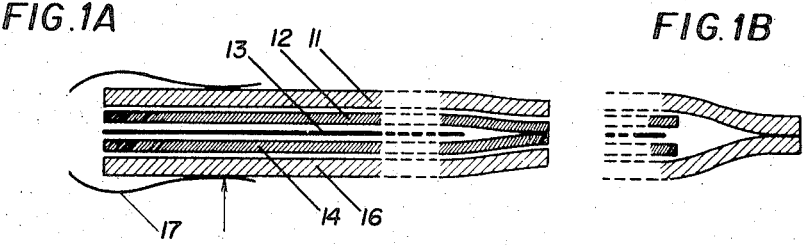
FIG. 1a is a cross-sectional view schematically depicting a preferred embodiment of an electrode employed in accordance with the present invention.
FIG. 1b is a modification of the edge portion of the electrode.

FIG. 1a illustrates therein schematically the construction of an electrode and having the following reference numerals for the respective elements:

11 being the upper protective layer;
12 the upper insulating layer;
13 the conductive electrode layer;
14 the lower insulating layer;
16 the lower protective insulating layer; and
17 the insulating strip which covers the cutting point or surface and is rigidly connected with the upper and the lower layer at the point marked by the arrow.

Represented at part A is the sealing of the marginal zone inclusive of the insulating layers; shown at part B is the sealing employing, however, solely the protective layers.

FIG. 1b illustrates a slightly different structural arrangement for the edges of the electrode. That is, the upper and lower insulating layers 12 and 14 are terminated prior to the joining of the edges of the upper and lower protective layers 11 and 16.

Figure 2:
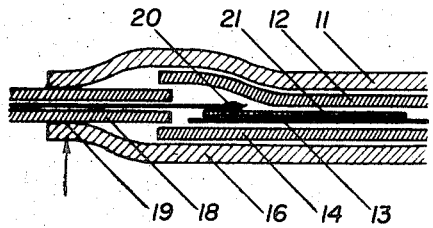
FIG. 2 is a cross-sectional view showing the electrical connection between the source and the electrode.

FIG. 2 illustrates the insertion of the electric feeder line into the electrode construction according to FIGS. 1a and 1b:

Reference numerals 11 to 16 are therein the same elements as in FIG. 1;

21 being a metallic soldering lug;
20 the soldering joint;
18 a metallic vein; and
19 the insulation of the feeder line.

At the point marked by the arrow, the insulation of the supply line is rigidly connected with the upper and lower layers of the electrode.

Figure 3:
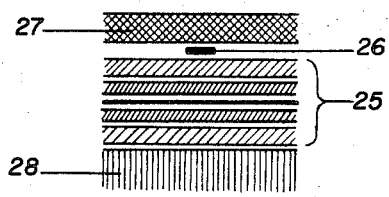
FIG. 3 is a cross-sectional view of a section of a conductive band.

FIG. 3 illustrates the network of conductive bands and having the following reference numerals for the respective elements, 25 being the construction as shown in FIG. 1;
26 the conductive band;
27 the upper covering; and
28 the lower base.

Figure 4:
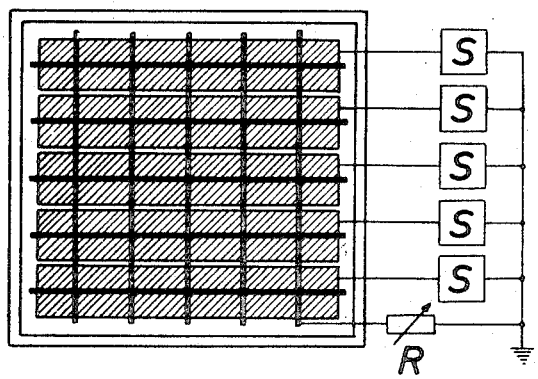
FIG. 4 is a view depicting an inventive arrangement of sheets and conductive bands within a confined space.

FIG. 4 illustrates the arrangement of sheets and conductive bands within a confined space. S indicates individual voltage sources and R is a controllable resistance or equivalent circuit elements by means of which the network of bands is connected to the earth potential.

FIG. 5 illustrates schematically the shape and construction of a sheet of electrodes and having the following reference numerals for the respective elements:

13 being the conductive electrode as indicated by the dashed lines;
15 represents the outline of the lower and upper protective layers and insulating layers;
22 being an aperture in the electrode sheet;
23 represents circular or marginal areas (also referred to as rims);
18 being an electrical connector which is brazed to the electrode sheet 13 and which supplies the required electrical power; and
19 being the insulation of the connector.

Contrary to the prior art, the electrodes being enclosed, in accordance with the present invention, within materials having a very high insulating resistance give off only extremely low currents. The insulating material is preferably made from synthetic substances, such as, for example, polyethylene, polyvinyl chloride (PVC), and the like, so that, by virtue of the hermetic sealing of the electrodes on all sides thereof, i.e. a covering thereof on all sides, no moisture can penetrate nor produce electrolytic leakage currents, or the like. It is not necessary, however, that the insulating material assume at the same time also the function of a protective layer guarding the conductive layer proper against mechanical damage. Rather, it is intended that this function be taken on by more suitable and more durable materials which are inexpensive to make, such as, for example, paper, jute, casting compounds and the like (FIGS. 1a and 1b).

According to the present invention, the electrode material consists of either metal or other conductive substances in the form of flat, spread-out foils. The thus resulting flexibility of the entire structure of the insulating and protective layers and the small thickness thereof (several millimeters or less) results in a number of significant advantages which distinguish the present invention over the prior art processes and apparatus, and specifically:

(a) The electrodes may be placed under the floor covering, carpet or the like. Since the construction of the electrodes and the connection thereof with the lower base and with the covering is intended and provided as a total construction unit that assures stability against the shearing forces arising during the walking thereon and the like, there is no visible nor directly discernible difference in the outward appearance and in the use of a space provided with the electrodes as compared to conventional rooms. The same is true when the electrodes are glued to walls or ceilings, for example, which is readily possible at any time because of the low weight of the electrodes and allows for a space-saving and economical installation of the arrangement as compared to the open ceiling electrodes etc. which must be freely suspended on insulators.

(b) The electrodes may also be so made as to be rigidly connected with carpets, with textile coverings for doors, furniture and the like, as well as with parts of beds, blankets or the like, so that the resulting constructions are easy to manipulate and may be inconspicuously accommodated in living rooms and in work rooms. The flexibility of the electrodes also renders it possible that the location thereof be changed and that they be adapted to corners, molds and the like, a problem which arises in connection with easy chairs and other pieces of furniture.

(c) The electrodes which can be made in sheets per running meter, are easy to transport. They may be prepared for installation on the spot since they are sealingly closed off at the edges thereof and may quite readily be sealed also at the end faces by means of simple technical methods, such as for example, gluing insulating bands over the cutting points or surfaces (FIGS. 1a and 1b). The cutting points or surfaces, in turn, serve as access for the connection of the electrical feeder lines, and specifically for example in a manner such that, during the manufacture of the sheets, the conductive layer is not glued, over an elongated strip a few centimeters wide, to the upper or to the lower layer so that accordingly the introduction, at any desired cutting point or surface extending transversely to the sheet, of a soldering lug or the like having a corresponding width and being brought into conductive contact with the electrode layer is rendered possible thereby. The soldering lugs are already securely connected to the supply lines, and it suffices to carry out immediately merely the packing, sealing, etc. of the access point by using the same or a similar method as is employed for the end faces themselves (FIG. 2).

(d) By reason of the completely insulated construction of the electrodes it is possible to remove in the course of normal routine cleaning any dust, soot or other particles from the air which are deposited either thereon or on the adjacent layers. This is of decisive significance for rooms in which an extraordinary development of dust, vapor and the like occurs and in which the deposit thereof on complicated electrode structures would mean that cleaning could only be effected after prolonged periods of time, and that there would continuously by the detachment and whirling up of the deposit. Moreover, the cleaning of flat electrodes and the treatment thereof with disinfectants and the like is considerably simpler and safer than is true for the case of the more complicated, angled structures or grids which additionally must be secured to insulators. Also, it is totally unimportant whether the electrodes of the present invention come into contact with water or not since even in that case no leakage current can be produced between the electrode layer and the outside atmosphere. Additionally, an increasing load of the voltage sources due to current flow is effectively prevented by virtue of the process and apparatus according to the present invention so that no unforeseen short circuits or other accidents can in fact result even between the individual cleaning processes.

(e) For the use of the electrodes as proposed by the present invention at the ceilings of rooms and the like, which involves the question of permeability with respect to gases and vapors, it is proposed that the electrodes be provided with a plurality of apertures, but in a manner such that the marginal areas of the apertures are insulated and sealed off in order to preclude any contact of the electrode layer with the outer atmosphere.

(f) In confined spaces or rooms which are susceptible to the danger of explosions, or in rooms wherein high electrostatic charges are undesirable, it is proposed that a network of thin conductive bands be inserted under the covering layer of the electrodes. In other words, the insertion is made between the insulating and the protective layers, and respectively below the upper covering or lining. This network is connected, via a separate circuit device, for example one or several potentiometers, or analogous controllable electronic devices, with the earth potential. If desired, a different voltage source having the opposite sign, may be utilized so that a constant efflux of excessive loads is assured (FIG. 3).

By regularly cutting off the voltage sources, one prevents the load displacements from occurring—as a result of the influence of these fields—within the conductive or semiconductive bodies that are present in the area of the fields are consolidated and lead to lasting, possibly harmful changes. Instead, it is desirable that particularly biologial systems be subjected to irritating effects of the electric field for a short period of time, as in the open air, and that a field-free phase set in thereafter. This reciprocal play corresponds to the constantly changing movements of air which bring to the humans and the like quantities of air of varying physical composition or condition, thereby continuously changing the influences of the natural electric field of the earth. This holds true to a particular extent for animals and for men who move about in the open air and thus pass, during longer or shorter periods of time, into largely field-free spaces, for example under trees.

The turning on and off of the voltage sources is effected by means of either mechanical or electronic pulse generators which are coupled, in turn, to meteorological instruments or to manually controllable switching networks. With the aid of the latter it is possible to physically change or vary the largely field-free inner spaces, for example living rooms or industrial rooms and the like, in a manner which corresponds to the normal outer atmosphere. In addition thereto, the loads of the electrical structures of biological organisms, such as plants, animals and human beings, which arise due to extreme weather conditions, may be compensated by making available thereto a favorable electrical medium.

In this manner it is possible to also counteract damages which may have been caused by a prolonged stay within field-free spaces and the like.

In any case, it is a question of making available the field-electric component of the atmosphere which is naturally present but has been lost or was restricted due to measures of civilization, yet in a form which allows for the adjustment within wide limits to requirements and respective weather conditions, such as is called for in case of technical devices for maintaining a specific physical level, for example heating plants with temperature regulation.

In order to assure that, within spaces in which several human beings and animals are present, an adjustment of the field intensity and direction as well as the pulse sequence relative to the individual demands, habits, etc. can in fact take place, it was necessary to assure that a spatial limitation and intensification of the field effects within smaller areas is rendered possible with the aid of small electrode units, suitable for example for installation into tables, chairs, beds, etc.

But also a delimitation of the electrical areas or zones and a largely variable spatial field line distribution are quite possible according to the present invention in view of the fact that the handy, non-dangerous and adaptable form of the electrodes is suitable equally for being secured to partitioning walls between working places, cabins, seating and resting places, compartments, and the like.

Various modifications are contemplated and may be obviously resorted to by those skilled in the art without departing from the spirit and scope of the invention as hereinafter defined by the appended claims, as only preferred embodiments thereof have been disclosed.

What is claimed is:

1. Apparatus for producing electric fields of field strengths comparable to those of the natural electric field of the earth in an enclosure such as a room, which fields are surrounded by conductive materials such as metal, steel-reinforced concrete, and other building materials which incorporate electrically-conductive substances, comprising:

a plurality of flat, sheet-like, flexible electrodes mounted in said enclosure;

each of said electrodes comprising five successive layers of three different materials;

first, a layer of protective material that is resistant to mechanical damages;

second, a substantially thin layer of electrically insulating material;

third, a layer of electrically conductive flexible foil;

fourth, another substantially thin layer of electrically insulating material; and fifth, another layer of protective material that is resistant to mechanical damages;

all five of said layers being physically connected together;

said electrodes being each and severally electrically insulated at the edges thereof;

at least one voltage source for delivering power to said electrodes, said voltage source having an output voltage that alternates between a constant high voltage and earth potential in moderately rapid succession;

the pulse rate of the voltage source being manually adjustable;

the said high voltage being of such an absolute value so as to produce in said room an average electric field strength of the order of the average field strength of the earth's electric field in open country near the ground;

and means to electrically connect said at least one voltage source to said third layer of each of said electrodes, wherein when said room is susceptible to the danger of explosions, or said room contains high electrical charges which are undesirable, the covering protective layer of said electrodes is lined with a network of conductive bands, said network in turn being electrically connected with the earth potential via controllable circuit elements, so that only limited and acceptable charge collections can arise.

2. Apparatus according to claim 1, wherein the third layer of each of said electrodes is smaller than the other four layers, and said third layer is enclosed at the edges thereof by a rim running parallel to the outer edge of said four layers, the width of said rim being of the order of a few centimeters, and the second and fourth layer being glued together along the entire length and across the entire width of said rim in such a manner as to provide a water-tight sealing.

3. Apparatus according to claim 1, wherein said electrodes are attached to the walls, ceiling of said room, and placed under floor coverings such as wooden floor boards, carpet, linoleum, and similar materials selectively.

4. Apparatus according to claim 1, wherein said electrodes are of such size that they may be installed in articles of furniture such as chairs, tables, beds, and the like located in said room.

5. Apparatus according to claim 1, wherein said means to connect said voltage source to the third layer of each of said electrodes consists of a flexible insulated cable containing a conductor, which is passed between the second and fourth layers and then below or above the third layer of said electrode, said second and fourth layers being glued to the insulating material of said cable in such a manner as to ensure water-tightness surrounding the passage of said cable into said electrode, the insulating material being removed from said cable along a stretch of at least several centimeters beginning from the outer edge of the third layer of said electrode and ending inside said electrode, ensuring that the exposed conductive part of the cable is in conductive electrical contact with said third layer of said electrode, the end of the exposed conductive part of said cable being either soldered to the third layer of said electrode or being soldered to a strip of thin flat metal.

References Cited

UNITED STATES PATENTS

| | | | |
|---|---|---|---|
| 3,311,108 | 3/1967 | Cristofv et al. | 317—262 AE X |
| 3,483,672 | 12/1969 | Johnke | 317—262 AE X |
| 2,994,059 | 7/1961 | Dahlgren et al. | 174—117 X |
| 3,417,302 | 12/1968 | Lueder | 317—262 |
| 3,251,927 | 5/1966 | Iovenko | 174—117 FF |
| 1,983,520 | 12/1934 | Charch et al. | 174—117 FF |

FOREIGN PATENTS

| | | | |
|---|---|---|---|
| 580,548 | 8/1959 | Canada | 317—262 |
| 976,702 | 10/1948 | France | 174—117 FF |

OTHER REFERENCES

Scientific American Oct. 11, 1913, "Electrified Chicken—Electricity as a Growth Stimulator."

J D MILLER, Primary Examiner

H. E. MOOSE, JR., Assistant Examiner

U.S. Cl. X.R.

174—117 FF